US006542318B2

(12) United States Patent
Just

(10) Patent No.: US 6,542,318 B2
(45) Date of Patent: Apr. 1, 2003

(54) TESTING STAND FOR PRINTING PLATES

(75) Inventor: Christa Just, Weilheim/Teck (DE)

(73) Assignee: Just Normlicht Vertriebs-GmbH, Weilheim/Teck (DE)

( * ) Notice: Subject to any disclaimer, the term of this patent is extended or adjusted under 35 U.S.C. 154(b) by 0 days.

(21) Appl. No.: 09/855,659

(22) Filed: May 15, 2001

(65) Prior Publication Data

US 2001/0043410 A1 Nov. 22, 2001

(30) Foreign Application Priority Data

May 17, 2000 (DE) .......................... 100 23 912

(51) Int. Cl.⁷ .............................................. G02B 27/02
(52) U.S. Cl. ...................................... 359/806; 359/809
(58) Field of Search ................................ 359/804, 805, 359/806, 807, 809, 801, 802, 798, 799, 800, 803, 808, 810, 811

(56) References Cited

U.S. PATENT DOCUMENTS

| 2,604,009 A | * | 7/1952 | Walrath | ...................... 359/806 |
| 4,566,325 A | * | 1/1986 | Rante | ....................... 73/432.1 |
| 4,862,614 A | * | 9/1989 | Shettleroe | ..................... 40/593 |
| 5,639,156 A | * | 6/1997 | Broxson | ....................... 362/99 |
| 5,757,560 A | * | 5/1998 | Fisherman | .................. 359/821 |

FOREIGN PATENT DOCUMENTS

| DE | 8303388 | 6/1983 |
| DE | 3347925 | 8/1985 |
| DE | 3132783 | 7/1991 |

OTHER PUBLICATIONS

Barent & Co., Mega–Stahl, Augsburg, Germany, Offsetplattenprüfstand, 1990.

* cited by examiner

*Primary Examiner*—Georgia Epps
*Assistant Examiner*—Saeed H Seyrafi
(74) *Attorney, Agent, or Firm*—Friedrich Kueffner

(57) ABSTRACT

A testing stand for printing plates has an upright frame, a printing plate support having opposed lateral ends, and guide members connected to the opposed lateral ends of the printing plate support. The guide members engage the frame and connect the printing plate support to the frame so that the printing plate support is vertically moveable. A magnifying glass carriage is slidably connected to the printing plate support. An illumination device is connected to the frame.

19 Claims, 1 Drawing Sheet

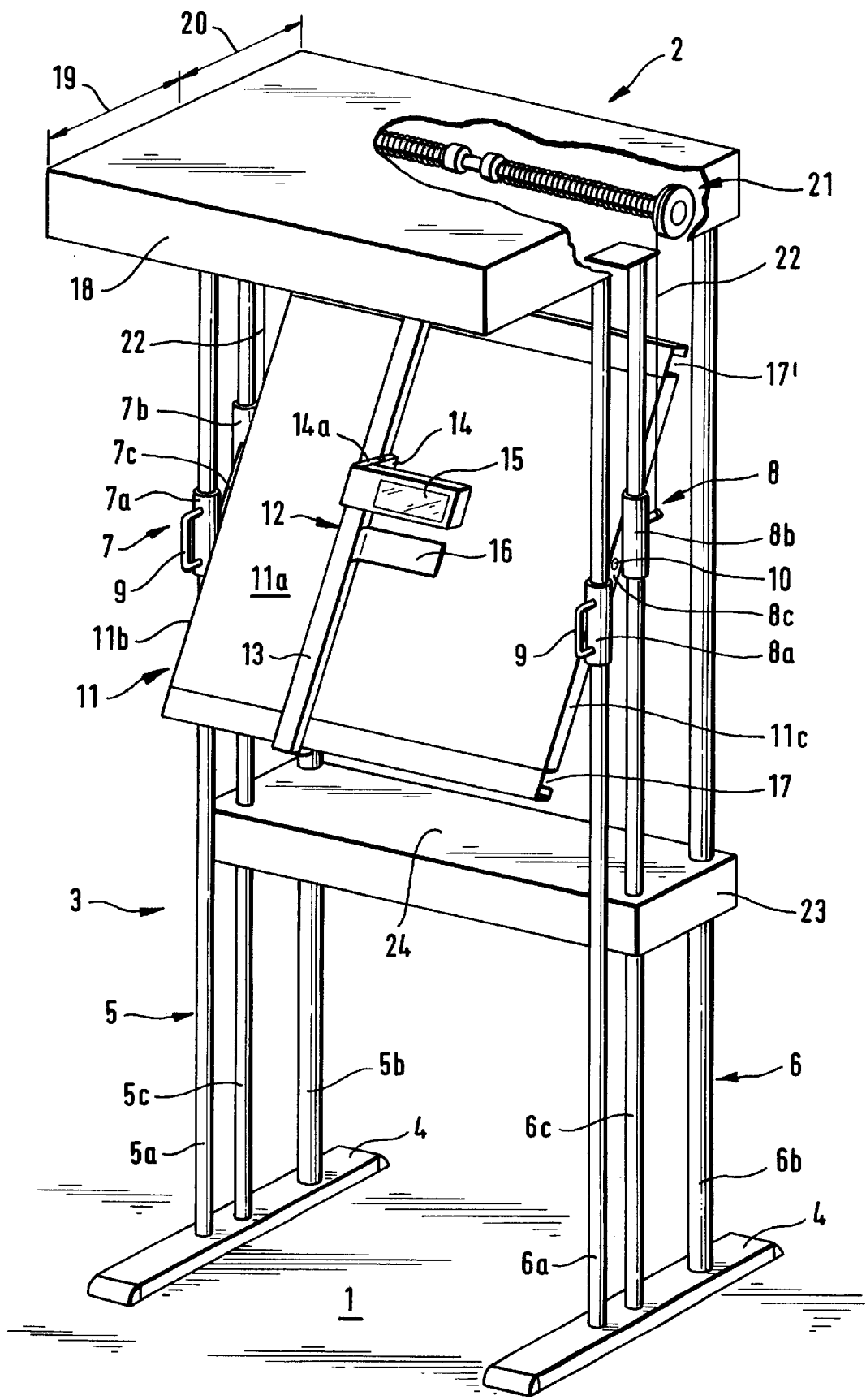

TESTING STAND FOR PRINTING PLATES

BACKGROUND OF THE INVENTION

1. Field of the Invention

The invention relates to a testing stand for printing plates, comprising a movable printing plate support, a movable magnifying glass carriage including a correlated hand rest, and an illumination unit as well as a frame, with means for holding and guiding the aforementioned components provided on the frame. Such testing stands are used for inspection of printing plates in the graphic design industry.

2. Description of the Related Art

Testing stands for printing plates are known, i.e., so-called offset printing plate testing stands, for example, disclosed in the brochure "megastahl", offsetplatten-prüfstand, brochure 9003 of the company Barent & Co. -megastahl, Augsburg, Germany, wherein an almost vertically positioned printing plate support is vertically slidably arranged in guides positioned on both sides and mounted on sidewalls.

For providing the slightly rearwardly inclined position of the printing plate support, the forward edges of the aforementioned sidewalls are slanted to the rear and a guide for the vertical sliding action of the printing plate support is stationarily arranged on the forward edge, respectively. The sidewalls and the printing plate support guided therebetween form a so-called common upper part which can be placed onto a base frame. For increasing the stability of the upper part, behind the vertically movable printing plate support, between the aforementioned sidewalls, at least one wall connecting the latter is provided which is generally parallel to the movable printing plate support. Moreover, in front of the movable printing plate support a working frame is arranged which has an upper rail and a lower rail which are secured by means of laterally arranged plate-shaped guide members at a spacing to one another. Each one of the lateral guide members is moveably and lockably arranged in a guide rail, respectively, and the guide rails are arranged stationarily on the guides of the printing plate support. The upper rail of the working frame is moreover provided for securing a magnifying glass that is movable in the horizontal direction as well as for receiving parts of the illumination unit. The lower rail of the working frame serves also as a support rail for the hand of the operator as well as for receiving parts of an illumination unit which illuminates the open area between the lower and the upper rails. In preparation for inspection of the printing plate, the operator moves the working frame to an eye level position and locks it then in the selected position. For inspecting the selected section of the printing plate, the operator moves, usually with his left hand, the printing plate support substantially vertically in the upward or downward direction so that the section of the printing plate to be inspected appears between the upper and lower rails of the working frame. The illumination unit arranged within the working frame illuminates the section of the printing plate between the upper and the lower rails of the working frame for inspection. The areas of the printing plate positioned above and below the working frame are illuminated only by the normal ambient light. The inspected section, on the other hand, is exposed to a very high light intensity which, depending on the type of the printing plate, can result in significant after exposure of the same.

For facilitating the movement of the printing plate support, the printing plate support is connected with a counterweight arranged in its upper part. When printing plates of different sizes are inspected successively, the adaptation of the counterweight to the mass of the printing plate to be inspected is relatively complex.

In order to be able to inspect the selected section of the printing plate more closely, the operator must first move the printing plate support to such an extent that the corresponding horizontal strip of the printing plate appears in the area of the working frame and subsequently he must move the magnifying glass to such an extent that the corresponding section within the horizontal strip can be viewed enlarged. This means that the operator with his "auxiliary" hand must move sequentially two different components of the testing stand in order to reach the section of the printing plate to be inspected more closely. For moving the aforementioned two components, the operator will usually not use his "working" hand and because the working hand generally holds working tools, for example, a retouching brush for corrective work on the printing plate.

As can be further taken from the brochure "megastahl", catalogue 9801, "Ihr starker Partner in der grafischen Industrie" (Your strong partner in the graphic design industry) of the company Grassinger KG, Bobingen, Germany, nothing has changed over the years with respect to the above described basic principle of the configuration of a testing stand for printing plates used in the graphic design industry. From the last mentioned brochure it can be taken that only minimal changes in the configuration of the aforementioned working frame have resulted. A further disadvantage of these known testing stands is moreover their massive and thus heavy construction.

SUMMARY OF THE INVENTION

It is an object of the present invention to provide a testing stand for printing plates which substantially does not exhibit the aforementioned disadvantages of the known testing stands and which can be manufactured with a reduced manufacturing-technological expenditure as much as possible.

In accordance with the present invention, this is achieved in that on the printing plate support on both sides a respective guide member is arranged, wherein these guide members are connected to the frame and wherein the respective guide path for these guide members are positioned vertically.

In accordance with the present invention, this is achieved for a method for inspecting printing plates in that the printing plate support is positioned in an optimal basic position for the operator and in that, for the section-wise manual visual inspection, alternatingly a magnifying glass carriage, which secures the optical aid as well as a hand rest, is guidedly moved in the horizontal direction and/or the optical aid together with the hand rest is guidedly moved in the vertical direction.

The new testing stand for printing plates is characterized particularly in that a basically different configuration in comparison to known testing stand is selected. In particular, and especially, this testing stand for printing plates, which comprises a movable printing plate support, a movable magnifying glass carriage with a correlated hand rest, an illumination unit as well as a frame with means for holding and guiding the aforementioned components, is realized such that the almost vertically positioned movable printing plate support is movable only in the vertical direction, in contrast to the prior art construction principle according to which the printing plate support is moved in a plane that is slanted relative to the vertical direction. With this new and significant construction detail it is ensured that the lower edge of the printing plate support, which projects farthest toward the operator, has always a constant spacing to the body of the operator and, in contrast to the known testing stands, does not come closer and closer to the body of the operator upon movement in the downward vertical direction.

Preferably, on both lateral ends or sides of the printing plate support a guide member is arranged, respectively, wherein these guide members are connected to the frame and wherein the respective guide path for these guide members is positioned in the vertical direction. A special configuration provides that the guide members are slide bearings which are slidably secured on a column of the frame, respectively.

Moreover, it is preferably provided that the illumination unit of the testing stand is arranged in a head member of the frame which is open in the downward direction. The illumination unit is an asymmetric lamp.

A further development provides that the printing plate support is arranged on the guide members so as to be pivotable about a horizontal axis and is lockable in a selected pivot position.

Moreover, it is particularly provided that the horizontal guide for a magnifying glass carriage is arranged directly on the body of the printing plate support. Instead of two horizontally positioned, spaced apart guide members of a working frame, extending over the entire width of the printing plate support and securing a magnifying glass and forming a hand rest for the operator, it is now provided according to the invention that the magnifying glass is arranged on a guide rail positioned at a right angle to the horizontal direction and coupled with the aforementioned lower and upper horizontal guides. Underneath the glass carriage glass, a hand rest is arranged on this substantially vertically positioned guide rail wherein the hand rest has only the respective width required for securely resting the hand of the operator. The magnifying glass and the hand rest are preferably slidably arranged.

With these constructive measures it is ensured that a surface area as small as possible of the printing plate to be inspected is covered during inspection by components of the testing stand.

Moreover, it is particularly provided that the movable printing plate support is connected by means of at least one cable with a spring unit for the purpose of weight compensation, wherein the spring unit is preferably arranged in the rear portion of the head member of the frame.

Preferably, it is provided that a tabletop is secured on the frame underneath the printing plate support and provides in direct vicinity of the printing plate support an additional shelf surface.

Moreover, the subject-matter of the present invention includes a novel method for inspecting a printing plate, wherein the printing plate, while resting against a printing plate support of a testing stand, is manually inspected by an operator in sections and, if needed, is visually inspected with temporal use of optical aids. This method for inspecting a printing plate is characterized in that the printing plate support is positioned in an optimal basic position for the operator and, for the manual visual inspection, alternatingly a magnifying glass carriage, comprising the optical aid and a hand rest, is guidedly moved in the horizontal direction and/or the optical aid together with the hand rest is guidedly moved in the vertical direction.

It is moreover advantageous that the printing plate support, even during movement of the magnifying glass carriage and/or of the optical aid, is guidedly movable in the vertical direction and that the vertically guided printing plate as well as the magnifying glass carriage and/or the optical aid are lockable alternatingly within their movement range, as needed.

Preferably, it is provided that the plate support is illuminated with inspecting light from above by means of an asymmetric lamp.

The testing stand according to the above described new construction principle is particularly useful for performing the method.

The testing stand for printing plates according to the invention and the new method according to the invention are suitable, in particular, for use in the computer-to-plate process (CtP). Prior art offset printing plate testing stands have only a narrow working field that is illuminated, sometimes with two tubes which, in connection with the CtP process, has the disadvantage that with the high light concentration the printing plate that is momentarily being inspected is after-exposed. With the illumination unit according to the invention, the working area on the printing plate support, despite a considerably reduced light concentration on the positioned printing plate, is uniformly illuminated without any disadvantages for the viewer.

The guide elements according to the invention in addition to the novel construction principle for the frame provide a significantly more flexible and comfortable manipulation for the operator, wherein at the same time the manufacturing costs as well as the total weight of the testing stand have been lowered.

BRIEF DESCRIPTION OF THE DRAWING

In the drawing the only Figure shows in a schematic perspective view the testing stand according to the invention, with the top of the head member partially cut away to show the counterweight arrangement.

DESCRIPTION OF THE PREFERRED EMBODIMENTS

A testing stand 2 for printing plates according to the present invention is positioned on the floor 1. The testing stand 2 is used in the graphic design industry. In the special embodiment illustrated, on each base 4, instead of a single column 5 or 6, three vertically extending columns 5a, 5b, 5c and 6a, 6b, 6c are arranged. A head member 18 is connected to the upper ends of the front (5a, 6a), rear (5b, 6b), and middle (5c, 6c) columns. This head member 18 is substantially a hollow body whose lower surface is preferably completely open. In the front portion 19 of this head member 18, an illumination unit (not illustrated) is arranged which is comprised substantially and preferably of an asymmetric lamp. In the rear portion 20 of the head member 18, a spring unit 21 is arranged which will be explained in more detail in the following.

For guiding the printing plate support 11, onto whose front body surface 11a the specimen is placed, the left (11b) and the right (11c) body surfaces (lateral ends) are connected each with a guide member 7, 8. Each guide member 7, 8 is comprised of two bushing-like slide bearings 7a and 7b; 8a and 8b. Each pair of slide bearings 7a, 7b; 8a, 8b is connected by a connecting stay 7c or 8c. These slide bearings 7a, 7b; 8a, 8b are pushed onto the front (5a, 6a) and the middle (5c, 6c) columns and are slidable and lockably on them. The slide bearing 7a, 8a at the front is provided with a forwardly extending grip 9, respectively.

In a further special embodiment it is provided that a respective drag bearing 10 is arranged on the connecting stays 7c, 8c so that the printing plate support 11 secured on the guide members 7, 8 can be pivoted out of the vertical position to the rear about a virtual horizontal axis which extends through the pivot axis of the drag bearing 10, wherein the preferred slant angle is 10 to 15°.

At the upper and lower body surfaces of the printing plate support 11, upper and lower horizontal guides 17, 17' are arranged. A guide rail 13 of a magnifying glass carriage 12 is positioned at a right angle to the horizontal direction and is horizontally slidably mounted on the lower and upper horizontal guides 17, 17'.

A vertically movable mounting plate 14 is guided on this guide rail 13. An optical aid, here a magnifying glass 15, as well as a hand rest 16, located underneath the magnifying glass 15, are fastened on the plate 14.

According to a further special embodiment, it is provided that the magnifying glass 15 is secured by means of an alternatingly laterally pivotable leg 14a on the mounting plate 14. If needed, the magnifying glass 15 can thus be laterally pivoted so that it comes to rest on the guide rail 13 and, if needed, provides an even larger freely accessible inspection area for the operator.

A further configuration variant of the present invention resides in that for the weight compensation of the printing plate support 11, instead of the otherwise conventional simple counterweight, the cables 22 engaging on opposite sides the printing plate support 11 or the guide members 7 and 8, are connected with their other ends to the lateral ends of a spring unit 21. This spring unit 21 has at least one coil or spiral spring whose initial tension force is selected such that the printing plate support 11 is essentially suspended in a weight-neutral arrangement. When printing plates with greatly varying mass are placed successively onto the printing plate support, with a simple adjustment of an adjusting ring (not illustrated-in the drawing) of the spring unit 21 the required initial tension force can be quickly and easily adjusted.

The new inventive construction principle for the aforementioned type of testing stand, in particular, the novel frame 3 of the testing stand 2, makes it possible that a tabletop 23, as illustrated in the drawing, can be arranged below the predetermined vertical movement area of the printing plate support 11 and can be secured on one or several of the columns 5a to 6c so that the operator has directly an additional shelf area 24 in the vicinity of the printing plate support 11. This tabletop 23 can be arranged fixedly or can be arranged slidably and lockably.

While specific embodiments of the invention have been shown and described in detail to illustrate the inventive principles, it will be understood that the invention may be embodied otherwise without departing from such principles.

What is claimed is:

1. A testing stand for printing plates, the testing stand comprising:
   an upright frame;
   a printing plate support having opposed lateral ends;
   guide members connected to the opposed lateral ends of the printing plate support, wherein the guide members engage the frame and connect the printing plate support to the frame so that the printing plate support is vertically moveable;
   a magnifying glass carriage slidably connected to the printing plate support; and
   an illumination device connected to the frame.

2. The testing stand according to claim 1, wherein the frame has a head member open in a downward direction, wherein the illumination device is arranged in the head member and comprises an asymmetric lamp.

3. The testing stand according to claim 1, wherein the printing plate support is configured to be pivotable about a horizontal axis and lockable in a selected pivot position.

4. The testing stand according to claim 1, wherein the printing plate support has an upper edge and a lower edge, wherein the upper edge has an upper horizontal guide and the lower edge has a lower horizontal guide, wherein the magnifying glass carriage is connected to the upper and lower horizontal guides.

5. The testing stand according to claim 4, wherein the magnifying glass carriage has a guide rail extending at a right angle to the upper and lower horizontal guides and having an upper end and a lower end connected to the upper and lower horizontal guides.

6. The testing stand according to claim 5, wherein the magnifying glass carriage comprises a magnifying glass and wherein the magnifying glass is vertically moveable on the magnifying glass carriage.

7. The testing stand according to claim 6, wherein the magnifying glass carriage comprises a mounting plate vertically slidably connected to the guide rail, wherein the magnifying glass carriage further comprises a hand rest, wherein the magnifying glass and the hand rest are connected to the mounting plate and wherein the hand rest is located underneath the magnifying glass.

8. The testing stand according to claim 1, wherein the printing plate support comprises a weight compensation arrangement comprising at least one cable and a spring unit.

9. The testing stand according to claim 8, wherein the frame has a head member and wherein the spring unit is arranged in a rear portion of the head member.

10. The testing stand according to claim 1, wherein the frame has parts forming a vertically oriented guide path for the printing plate support.

11. The testing stand according to claim 1, wherein the frame comprises two bases spaced apart from one another; at least one upright column provided for each one of the two bases, wherein the-upright column has a first end and a second end and wherein the first end is connected to the base, respectively; and a head member connecting the second ends of the upright columns to one another, wherein the guide members are arranged on the at least one upright columns, respectively.

12. The testing stand according to claim 11, wherein the guide members are slide bearings and are slidably secured on the upright columns.

13. The testing stand according to claim 1, further comprising a table top connected to the frame underneath the printing plate support.

14. A method for inspecting a printing plate, wherein a printing plate rests against a printing plate support of a testing stand and is manually inspected in sections by an operator, with use of an optical aid, if needed, for a visual inspection, the method comprising the steps of:

positioning the printing plate support in an optimal basic position for the operator;

alternatingly moving a magnifying glass carriage, comprising an optical aid and a hand rest, horizontally across the sections of the printing plate and moving the optical aid together with the hand rest vertically across the sections of the printing plate, wherein the testing stand has an upright frame and the printing plate support has opposed lateral ends, wherein guide members are connected to the opposed lateral ends of the printing plate support and engage the frame and connect the printing plate support to the frame so as to be vertically moveable, wherein the magnifying glass carriage is slidably connected to the printing plate support and an illumination device is connected to the frame.

15. The method according to claim 14, further comprising the step of vertically and guidedly moving the printing plate support during the step of alternatingly moving.

16. The method according to claim 15, further comprising the step of arresting the printing plate support in a selected position.

17. The method according to claim 14, further comprising the step of locking the magnifying glass carriage in a selected position.

18. The method according to claim 14, further comprising the step of locking the optical aid in a selected position.

19. The method according to claim 14, further comprising the step of illuminating with an asymmetric lamp emitting inspecting light the printing plate support and a printing plate positioned thereon.

* * * * *